United States Patent
Munoz Delgado

(10) Patent No.: US 12,450,488 B2
(45) Date of Patent: Oct. 21, 2025

(54) MEASUREMENT OF THE SENSITIVITY OF CLASSIFIERS BASED ON INTERACTING FAULTS

(71) Applicant: Robert Bosch GmbH, Stuttgart (DE)

(72) Inventor: Andres Mauricio Munoz Delgado, Weil der Stadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1028 days.

(21) Appl. No.: 17/351,677

(22) Filed: Jun. 18, 2021

(65) Prior Publication Data
US 2022/0012546 A1 Jan. 13, 2022

(30) Foreign Application Priority Data
Jul. 7, 2020 (DE) .......................... 102020208474.2

(51) Int. Cl.
  *G06N 3/082* (2023.01)
  *G06N 3/088* (2023.01)
  *G06T 7/00* (2017.01)
  *G06V 10/70* (2022.01)
  *G06V 10/82* (2022.01)

(52) U.S. Cl.
  CPC ............. *G06N 3/082* (2013.01); *G06N 3/088* (2013.01); *G06T 7/0004* (2013.01); *G06V 10/82* (2022.01); *G06V 10/87* (2022.01)

(58) Field of Classification Search
  None
  See application file for complete search history.

(56) References Cited

U.S. PATENT DOCUMENTS

2013/0279795 A1*  10/2013  Shlain .................. G06V 10/987
                                                                382/149
2018/0322623 A1   11/2018  Memo et al.
(Continued)

FOREIGN PATENT DOCUMENTS

WO        2018197074 A1    11/2018

OTHER PUBLICATIONS

Hu, Guanghua, et al. "Unsupervised fabric defect detection based on a deep convolutional generative adversarial network." Textile Research Journal 90.3-4 (2020): 247-270. (Year: 2019).*
(Continued)

*Primary Examiner* — Matthew C Bella
*Assistant Examiner* — Johnny B Duong
(74) *Attorney, Agent, or Firm* — NORTON ROSE FULBRIGHT US LLP

(57) ABSTRACT

A method for measuring the sensitivity of a classifier. The method includes: at least one input data set, including image data, is provided; an initial class assignment is ascertained for the at least one input data set with the aid of the classifier; a predefined number of different faults is ascertained from the input data set based on the objectives, in that a modification of the input data set formed by the joint application of all of these faults is mapped by the classifier to a class assignment, which differs from the initial class assignment according to the stipulation of a predefined criterion; while a modification of the input data set formed by applying only one of these faults is mapped by the classifier to a class assignment, which corresponds to the initial class assignment according to the stipulation of the predefined criterion.

13 Claims, 3 Drawing Sheets

(56) References Cited

U.S. PATENT DOCUMENTS

2019/0277913 A1* 9/2019 Honda ............... G01R 31/2894
2020/0034693 A1* 1/2020 Huh ....................... H01L 22/20

OTHER PUBLICATIONS

Skilton, Robert, and Yang Gao. "Visual detection of generic defects in industrial components using generative adversarial networks." 2019 IEEE/ASME International Conference on Advanced Intelligent Mechatronics (AIM). IEEE, 2019. (Year: 2019).*

Liu, Juhua, et al. "Multistage GAN for fabric defect detection." IEEE Transactions on Image Processing 29 (2019): 3388-3400. (Year: 2019).*

Niu et al., "Defect Image Sample Generation With GAN for Improving Defect Recognition," IEEE Transactions on Automation Science and Engineering, vol. 17, No. 3, 2020, pp. 1611-1622.

* cited by examiner

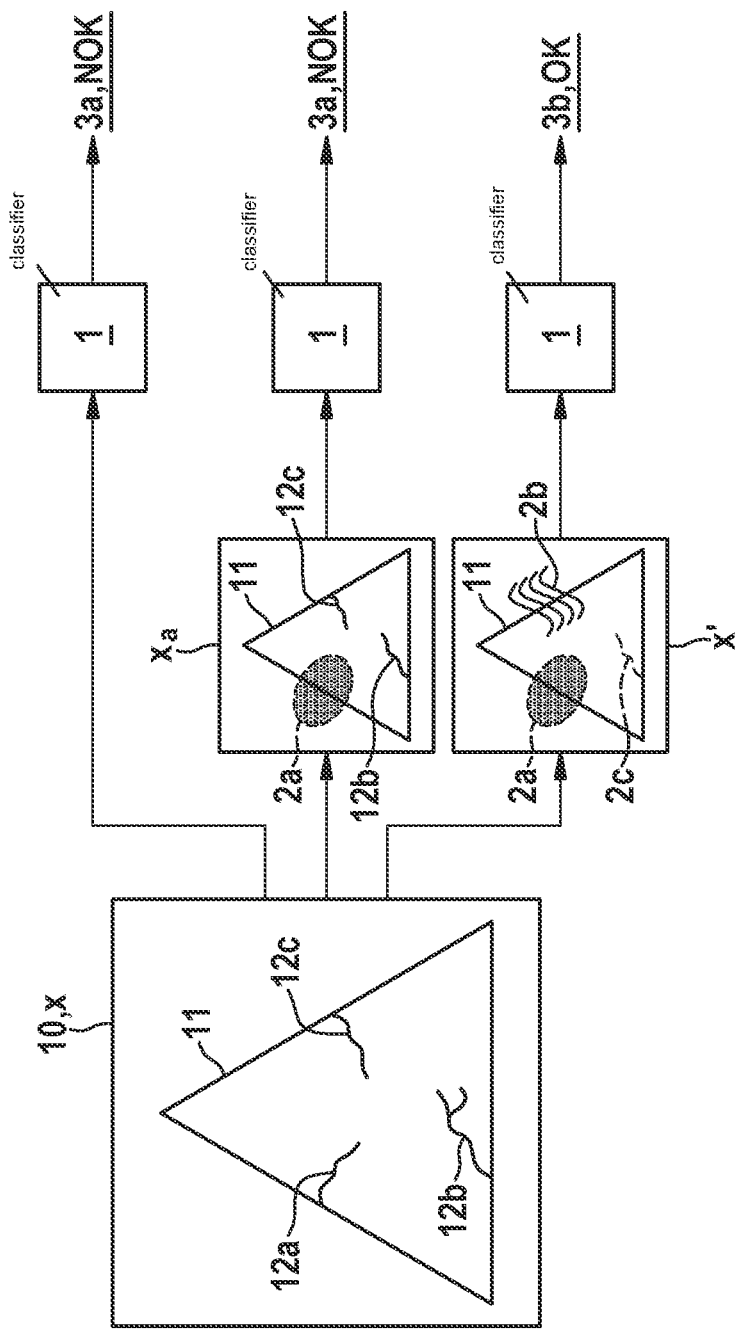

MEASUREMENT OF THE SENSITIVITY OF CLASSIFIERS BASED ON INTERACTING FAULTS

CROSS REFERENCE

The present application claims the benefit under 35 U.S.C. § 119 of German Patent Application No. DE 102020208474.2 filed on Jul. 7, 2020, which is expressly incorporated herein by reference it its entirety.

FIELD

The present invention relates to controlling the behavior of trainable classifiers, which may be used, for example, for the quality control of series-manufactured products.

BACKGROUND INFORMATION

During the series-manufacturing of products, it is generally necessary to continuously check the quality of the manufacturing. An attempt is made to detect quality problems as quickly as possible to be able to eliminate the cause as soon as possible and to not lose too many units of the particular product as rejects.

The visual control of the geometry and/or surface of a product is fast and non-destructive. PCT Patent Application No. WO 2018/197 074 A1 describes an inspection device, in which an object may be subjected to a large number of illumination situations, images of the object being recorded with the aid of a camera in each of these illumination situations. The topography of the object is evaluated from these images.

Images of the product may also be directly assigned to one of multiple classes of a predefined classification with the aid of an image classifier, based on artificial neural networks. On this basis, the product may be assigned to one of multiple predefined quality classes. In the simplest case, this classification is binary ("OK"/"not OK").

SUMMARY

Within the scope of the present invention, a method is provided for measuring the sensitivity of a classifier for image data to changes in the input image data. In accordance with an example embodiment of the present invention, the classifier assigns image data to one or multiple classes of a predefined classification. The image data may have been detected, for example, in particular with the aid of one or multiple sensors according to at least one arbitrary measuring modality. However, for example, the image data may also be realistic image data of at least one arbitrary measuring modality, which were obtained, for example, by simulating the measuring modality or generated with the aid of a generator of a GAN.

The image data may include, in particular, for example camera images, video images, ultrasound images, thermal images, radar images or LIDAR images. The term "image data" includes not only individual images or a sequence of individual images of this type, but also, for example, information about a dynamic change of image contents, such as a visual flow. However, image data may also be obtained, for example, by transforming other physical measured data, such as audio data, into a two-dimensional or three-dimensional representation.

Within the scope of the method, at least one input data set including image data is provided. An initial class assignment is ascertained for the at least one input data set with the aid of the classifier. This initial class assignment may assign one or multiple classes to the input data set, for example in the form of softmax scores for the available classes.

The term "input data set" does not designate the totality of all available input data, but rather one unit of input data, which is provided to the classifier for a single classification operation. In an image classifier, for example, an image data set may include, in particular, one image.

In accordance with an example embodiment of the present invention, a predefined number of different faults is ascertained from this input data set. A fault in this context is, in particular, for example a change suggestion for the image data, which allows the original image data to be at least roughly still recognized and yet is able to influence the class assignment supplied by the classifier. The faults are ascertained at least on the basis of two objectives, which are opposite to each other and may be arbitrarily weighted with respect to each other.

On the one hand, a modification of the input data set formed by the joint application of all ascertained faults is to be mapped by the classifier to a class assignment which differs from the initial class assignment according to a predefined criterion. The predefined criterion may include, for example, that the class for which the new class assignment has the highest confidence is to be a different class than the class for which the initial class assignment has the highest confidence. For this purpose, the faults may be aggregated in an arbitrary manner, for example by addition or averaging.

On the other hand, a modification of the input data set formed by applying only one of these faults is to be mapped by the classifier to a class assignment which corresponds to the initial class assignment according to the predefined criterion. For example, if the new class assignment has only 0.7 instead of 0.9 as the highest confidence in the initial class assignment, but this highest confidence is still attributed to the same class as in the initial class assignment, the new class assignment then still corresponds to the initial class assignment according to the aforementioned exemplary criterion.

The comparison of the new class assignment with the initial class assignment may take place in each case with the aid of an arbitrary metric, for example with the aid of a distance measure between vectors representing the class assignments.

It has been recognized that the faults ascertained in this way, which significantly change the class assignment only together, permit a better insight into the decision-making process of the classifier than, for example, a statement that the class assignment of an image may be changed by adding a number of apparently random pixels. On the one hand, faults which change the class assignment only together but not on their own are more subtle. Modifications of the image data obtained by applying these faults thus appear more realistic with a higher degree of probability in the context of the concrete application. On the other hand, the decision-making process of the classifier is more comparable with human decision-making processes, in which multiple factors also interact only together to change the class assignment.

For example, when checking people at airports or national borders, a large number of factors are taken into account and finally aggregated to form the decision as to whether the traveler in question should be allowed to pass through unhindered or which additional checks are sensible. For example, when looking for drug smugglers, some of the continuously used criteria are:

whether the traveler is arriving from a country placed on a list of risk countries;

whether the traveler will remain in the country for a conspicuously short period of time in relation to the distance traveled; or whether the traveler is not the same person who purchased the airplane ticket.

For each of these criteria, there are a great many non-smugglers who meet the particular criterion for a legitimate reason, so that no single criterion is sufficient for a practical classification as a smuggler or non-smuggler. Even normal tourists and business travelers also travel to risk countries. The reason for a conspicuously short stay may also be that the traveler is arriving only for a specific event. Booking airplane tickets for other persons is certainly common, in particular for business trips.

However, if one traveler meets two or even all three criteria, the time spent on a closer examination of the luggage or even an X-ray examination of the traveler often pays off, and the smuggler has a big problem.

In the case of the visual quality control of series-manufactured products, it is also not always possible to determine from a single defect or instance of damage whether the product is usable for its intended purpose. For example, not every scratch or crack in a component necessarily has the same serious impact on its strength. However, if multiple such instances of damage are present simultaneously, they may interact with each other during later stressing of the component and ultimately result in the failure of the component.

In one particularly advantageous example embodiment of the present invention, the faults are ascertained based on the further objective, in that the uncertainty of the class assignment is maximized by the classifier for modifications of the input data set formed by applying one of the faults. The fact that the uncertainty is particularly great is a sign that the modification is closer to a decision limit between two classes than the original input data set. The closer the decision limit, the greater is the local information and thus the entropy, since a minimal further change may result in the fact that the decision limit is crossed.

Based on a predefined classifier, the uncertainty of the class assignment by this classifier may be ascertained, for example, based on a distribution of class assignments, which result when neurons or other processing units of the classifier are deactivated ("Monte Carlo dropout") in accordance with a random distribution.

For example, the probability of a certain class assignment is approximated by an arithmetic mean using softmax scores, which were obtained in states of the classifier having different configurations of deactivated neurons or other processing units determined based on the random distribution in the direction of the same input. The entropy of this probability is then a measure of the uncertainty of the classifier in the case of the concrete input. The building blocks from which this uncertainty measure is assembled may all be differentiated. This may be utilized for the targeted search for inputs which increase the uncertainty.

However, the Monte Carlo dropout is only one example of many possibilities for quantifying the uncertainty.

A further arbitrary regularization may furthermore be optionally included as an additional objective. Modifications of the input data set may be prioritized thereby, which move the original input data set closer to the decision limit, as explained above. However, the tendency that "wild" and entirely unexpected changes prevail may be counteracted. Changes of this type may maximize the uncertainty because the classifier has not previously seen them, but at the cost of the modifications of the input data set no longer being sufficiently realistic in the context of the specific application. Examples of such "wild" changes are the introduction of colored pixels into a gray scale image and the random distribution of distorted pixels over an image. The regularization may now penalize, for example, high-frequency changes, which includes the random distribution of the distorted pixels, or even specific unwanted changes, such as colored pixels in a gray scale image. Modifications then tend to prevail which appear to be increasingly more realistic.

Between 1 and 20 faults may be particularly advantageously ascertained from the input data set. This number has proven to be usable for most types of image data.

The suitable number of faults may, however, also be ascertained, for example, in a self-consistent way. In one advantageous embodiment, the faults are clustered in an unsupervised manner for this purpose. This clustering results in a number of independent clusters, each of these clusters representing a family of similar faults. If the number of ascertained faults is increased, the number of these clusters will also initially increase until they finally converge. This is then a sign that a further increase in the number of faults will not do any further good, because no truly new classes of faults are generated.

In a further advantageous embodiment of the present invention, non-essential faults, upon the omission of which, the remaining faults effectuate a change of the class assignment of the remaining faults, are filtered out of the ascertained faults. In particular, for example non-essential faults may be sought according to an arbitrary criterion and possibly discarded until a set of faults which cannot be further reduced is ascertained, which must at least interact for a change of the class assignment.

For example, after clustering the faults, only one representative of each cluster may be selected in each case as the "best" representative, using an arbitrary metric, for example an Lp norm. For example, each fault may be successively deactivated as a test, and it may then be checked whether the class assignment has nevertheless still significantly changed. If this is the case, the tested fault is unnecessary and may be permanently omitted. This may be iterated until each of the existing faults is indispensable for the change of the class assignment.

In one particularly advantageous embodiment of the present invention, the input data set is mapped to the faults using a generator, whose behavior is characterized by generator parameters. For this purpose, the generator may be applied once as well as multiple times to the input data set. The objectives are combined in a cost function, so that each of the objectives contributes to the cost function. These contributions may be weighted with respect to each other within broad parameters. The generator parameters are optimized with the objective of the cost function assuming an optimal value, for example a maximum or a minimum. The behavior of the generator may thus be tailored to the selected weighting. For example, each objective may on its own be expressed in an individual cost function, and the overall cost function may be assembled from the individual cost functions as a weighted sum.

Take, for example, $$f: R^{M \times N \times 3} \to R^{m \times n \times k} \to R^c$$

a classifier, which initially maps an input image having M×N pixels and 3 color channels to k feature maps having m×n entries, before these feature maps are subsequently converted into real-valued classification scores for c classes.

$f_u$ is an uncertainty measure belonging to this classifier and dependent on the input image.

A generator g, which generates a predefined number j of faults of the input image, may then be written as map $$g: R^{M \times N \times 3} \to R^{m \times n \times j}.$$

Generator g may then be designed, for example, in such a way that it supplies only values in interval [0, 1] (for example using a tank function). Modifications Φ of an input image I may then be written, for example, as $$\Phi(I,m,P) = m \cdot P + (1-m) \cdot I,$$

where P is a permanently predefined fault, and m is a mask for applying this fault P, which was obtained as a "slice" of g having dimension $R^{M \times N}$. The interaction (aggregation) of multiple faults may then be described by an arbitrarily differentiable aggregation function φ as $$\varphi: R^{M \times N \times j} \to R^{M \times N}$$

The change of the uncertainty of the classifier by the faults may then be evaluated, for example using a cost function $$L_{gu} = \text{Mean}(f_u(\Phi(I, g(I), P)))$$

the mean value running across all j ascertained faults.

The extent to which individual faults result in a significant change of the class assignment, which should not be the case, may then be described with a cost function $$L_{gc} = \text{Mean}\left(\sum_j \phi(f(I), f(\Phi(I, g(I)_j, P)))\right)$$

Herein, f(I) is the classification vector, which an fault-free classifier supplies for input I, and φ is an arbitrary distance measure in the space of the classification vectors, such as a cross entropy measurement.

If a particularly great variability exists between the j "slices" of g, the mean value across these j "slices" may not be meaningful. In this case, for example, the cost function $$L_{gc} = \max_j \phi(f(I), f(\Phi(I, g(I)_j, P)))$$

may be used instead.

The extent to which the ascertained faults cumulatively result in a significant change of the class assignment may be evaluated, for example with the aid of the cost function $$L_c = \eta(f(I), f(\Phi(I, \varphi(g(I)), P)))$$

Herein, η is a function, which compares the classification vectors. This function should assume high values if the classification vectors are different, and in particular if the classification vectors refer to different classes. For example, the function η may be identical to the distance function φ.

The total cost function $L_{total}$ for training the generator g may then be formed, for example, as $$L_{total} = L_{gu} - L_{gc} + L_c,$$

weighting functions being omitted for the sake of clarity. This total cost function $L_{total}$ may be optimized using arbitrary optimization methods.

As explained above, an arbitrary regularization may be added to this total cost function $L_{total}$ as an additional term. It may be, for example, an arbitrary Lp norm. For example, sparse or homogeneous faults may be prioritized hereby.

For example, the generator may be designed at least partially as a neural network or another trainable module. If a network or module of this type is trained using a large number of input data sets, its power of generalization may be utilized so that suitable faults may be generated even for input data sets which are not seen during training.

The training of a generator of this type may also take place in an "adversarial" manner, similar to the training of a GAN, the original classifier then serves as a discriminator as to how good the faults are which are supplied by the generator. In contrast to the training of a GAN, this "discriminator" is, however, not further trained but instead remains as is. The training does not have to be limited to a single input image, but may take place across a complete distribution of input images, which are each presented in batches over a certain number of epochs. The generator then also learns the distribution of critical distributions in the input images.

In particular, the generator may include, for example, an auto-encoder, which is at least partially congruent with a feature extractor of the classifier. In particular, this feature extractor may include, for example, a convolutional part of a neural network within the classifier, which may be followed by, for example, pooling layers or fully networked layers up to the output of the class assignment. In this way, both the architecture and the already trained weights of the feature extractor may continue to be used. The training of the generator thus requires less computing power and is correspondingly faster. For example, the already fully trained feature extractor may thus already completely provide the encoder part of an auto-encoder used as the generator, so that only the decoder part of this auto-encoder needs to be trained.

In a further advantageous embodiment of the present invention, the generator parameters are additionally optimized to the goal that the faults ascertained with the aid of the generator are mapped by the classifier to a predefined desired class assignment. In this way, the optimization of the generator may be influenced in such a way that the modification of this input data set obtained by applying the faults to the input data set appears realistic in the context of the particular specific application.

In particular, the faults may each include, for example, a reduction of the information content of one part of the image data. For example, the information content may be reduced by masking, a Gaussian blur and/or contrast degradation of image areas. For example, the finding that the interaction of multiple quality defects during the recording of the images may result in a misclassification of the images may be present at the end of the method.

In one particularly advantageous embodiment of the present invention, the image data include images which were recorded at series-manufactured products. Images of this type are very frequently used for the rapid quality control of series manufacturing. The input data sets are then nominally very similar, so that a large database results for training the generator parameters. The ascertained faults show in an immediately comprehensible manner which changes in the images may result in that, for example, a product is sorted into the wrong quality class ("OK," "not OK=NOK" and possibly other intermediate levels).

For example, it is possible to check the extent to which the ascertained faults correspond to features in the images, which are relevant to the quality of the product. For example, if the optimization has shown that all or at least most of the ascertained faults are similar to defects and instances of damage known from the real production, this may be evaluated as a sign that the classifier is weighing the different visible defects and instances of damage against each other as desired and combining them into an overall judgment about the quality.

For example, it is however also possible to check the extent to which the ascertained faults render unrecognizable features in the images, which are relevant to the quality of the product. For example, if the optimization has shown that simultaneously rendering multiple different defects or instances of damage unrecognizable with the aid of a Gaussian blur result in the incorrect classification of a product as "OK," this may be evaluated as a sign that these defects or instances of damage are particularly important for assessing the quality of the product.

The methods may be, in particular, entirely or partially computer-implemented. The present invention therefore also relates to a computer program, including machine-readable instructions which, when run on one or multiple computers, prompt the computer(s) to carry out the described method. In this sense, control units for vehicles and embedded systems for technical devices, which are also able to carry out machine-readable instructions, are also to be viewed as computers.

Likewise, the present invention also relates to a machine-readable data carrier and/or to a download product, including the computer program. A download product is a downloadable digital product which is transferable via a data network, i.e., by a user of the data network, which may be offered for sale in an online shop for immediate downloading.

A computer may furthermore be equipped with the computer program, with the machine-readable data carrier or with the download product.

Further measures which improve the present invention are illustrated in greater detail below, together with the description of the preferred exemplary embodiments of the present invention, based on figures.

BRIEF DESCRIPTION OF THE DRAWINGS

FIG. 3 shows an example of an application of method 100 in the quality control of products 11, in accordance with the present invention.

DETAILED DESCRIPTION OF EXAMPLE EMBODIMENTS

Figure 1:
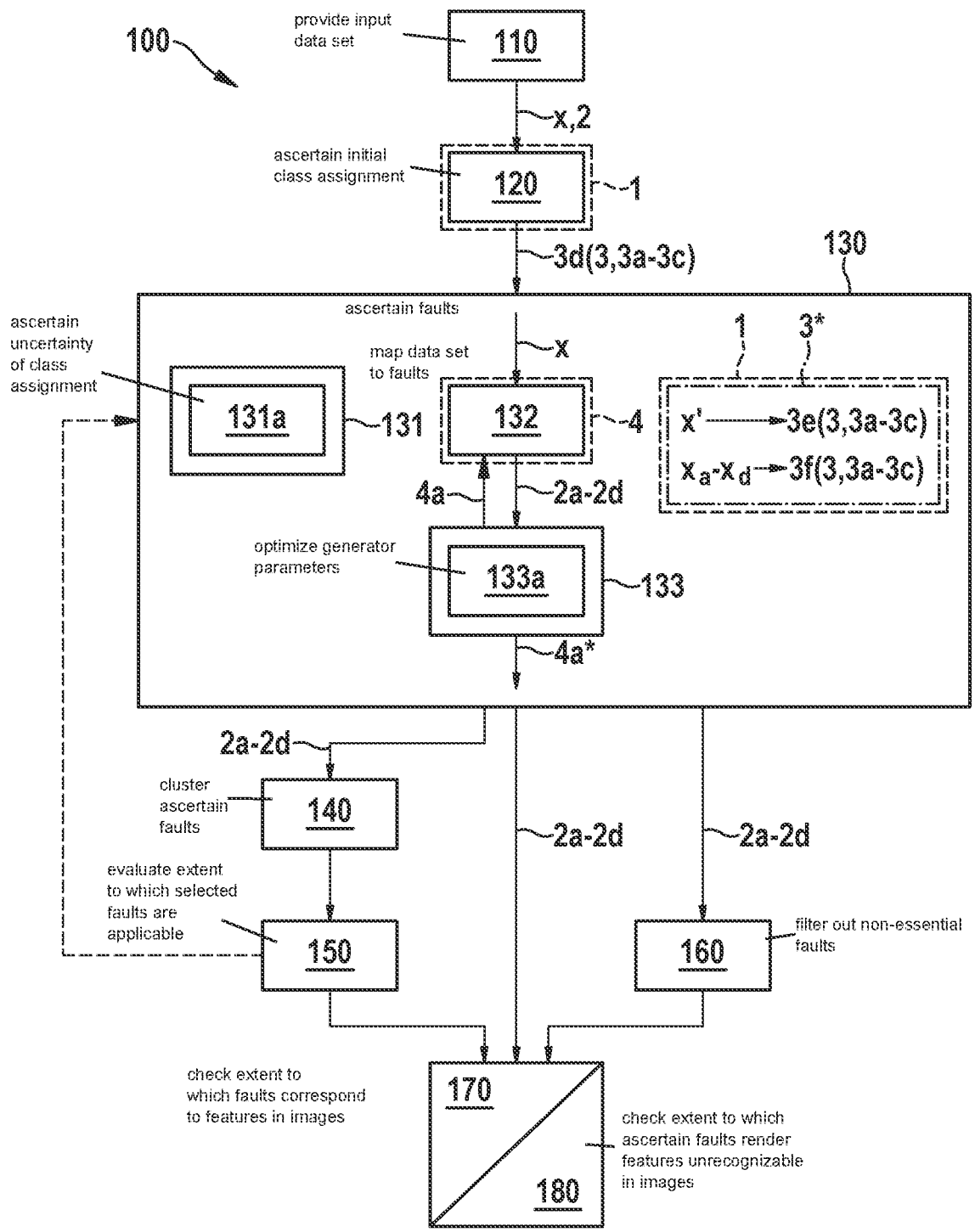
FIG. 1 shows an exemplary embodiment of method 100 for measuring the sensitivity of a classifier 1, in accordance with the present invention.

FIG. 1 shows a schematic flowchart of an exemplary embodiment of method 100. In step 110, at least one input data set x, including image data 2, is provided. In step 120, an initial class assignment 3*d* to one or multiple classes 3*a* through 3*c* of a predefined classification 3 is ascertained for the at least one input data set x with the aid of classifier 1.

In step 130, faults 2*a* through 2*d* are ascertained, based on objectives, in that a modification x' of input data set x formed by the joint application of all of these faults 2*a* through 2*d* is mapped by classifier 1 to a class assignment 3*e* which differs from initial class assignment 3*d* according to a predefined criterion 3*; while a modification $x_a$, $x_b$, $x_c$, $x_d$ of input data set x formed by applying only one of these faults 2*a* through 2*d* is mapped by classifier 1 to a class assignment 3*f* which corresponds to initial class assignment 3*d* according to predefined criterion 3*.

Original input data set x, on the one hand, and modification x', on the other hand, must thus be situated on different sides of a decision limit of classifier 1 defined by criterion 3*. However, numeric values, for example, may have indeed been changed into softmax scores in modifications $x_a$, $x_b$, $x_c$, $x_d$, but these modifications $x_a$, $x_b$, $x_c$, $x_d$ must still be situated on the same side of the decision limit defined by criterion 3*.

Exemplary embodiments of how faults 2*a* through 2*d* may be ascertained are indicated in box 130.

According to block 131, faults 2*a* through 2*d* may be ascertained, based on the further objective, in that the uncertainty of the class assignment is maximized by classifier 1 for modifications $x_a$, $x_b$, $x_c$, $x_d$ of input data set x formed by applying one of faults 2*a* through 2*d*. In particular, according to block 131*a*, the uncertainty of the class assignment by classifier 1 may be ascertained, for example, based on a distribution of class assignments, which results when neurons or other processing units of classifier 1 are deactivated ("Monte Carlo dropout") in accordance with a random distribution. As explained above, the tendency of the uncertainty being maximized by "wild" and entirely unexpected faults may be counteracted by a suitable regularization.

According to block 132, input data set x may be mapped to faults 2*a* through 2*d* using a generator 4, whose behavior is characterized by generator parameters 4*a*. Generator parameters 4*a* may then be optimized according to block 133 to the goal that a cost function, to which each of the objectives makes a contribution, takes on an optimal value. This training may be ended upon reaching an arbitrary abort criterion. The state of generator parameters 4*a* then reached is fully trained state 4*.

According to block 133*a*, generator parameters 4*a* may be additionally optimized to the goal that faults 2*a* through 2*d* ascertained with the aid of generator 4 are mapped by classifier 1 to a predefined desired class assignment.

Ascertained faults 2*a* through 2*d* may be clustered in an unsupervised manner in step 140. The extent to which the selected number of faults 2*a* through 2*d* is applicable to the specific application may then be evaluated in step 150, based on the number of clusters. If this number is not applicable, it is possible to branch back, for example to ascertain 130 a new predefined number of faults 2*a* through 2*d*.

In step 160, non-essential faults may be filtered out of ascertained faults 2*a* through 2*d*. Therefore, faults 2*a* through 2*d* are sought in the quantity of total ascertained faults 2*a* through 2*d* and possibly discarded if, when they are omitted, the remaining faults 2*a* through 2*d* continue to effectuate a change of the class assignment.

In one important application, image data 2 include images 10, which were recorded for the quality control of products 11. In this application, it is possible to check in step 170 the extent to which ascertained faults 2*a* through 2*d* correspond to such features 12*a* through 12*c* in images 10, which are relevant to the quality of product 11. Alternatively or in combination herewith, it is also possible to check in step 180 the extent to which ascertained faults 2*a* through 2*d* render features 12*a* through 12*c* unrecognizable in images 10, which are relevant to the quality of product 11.

Figure 2:
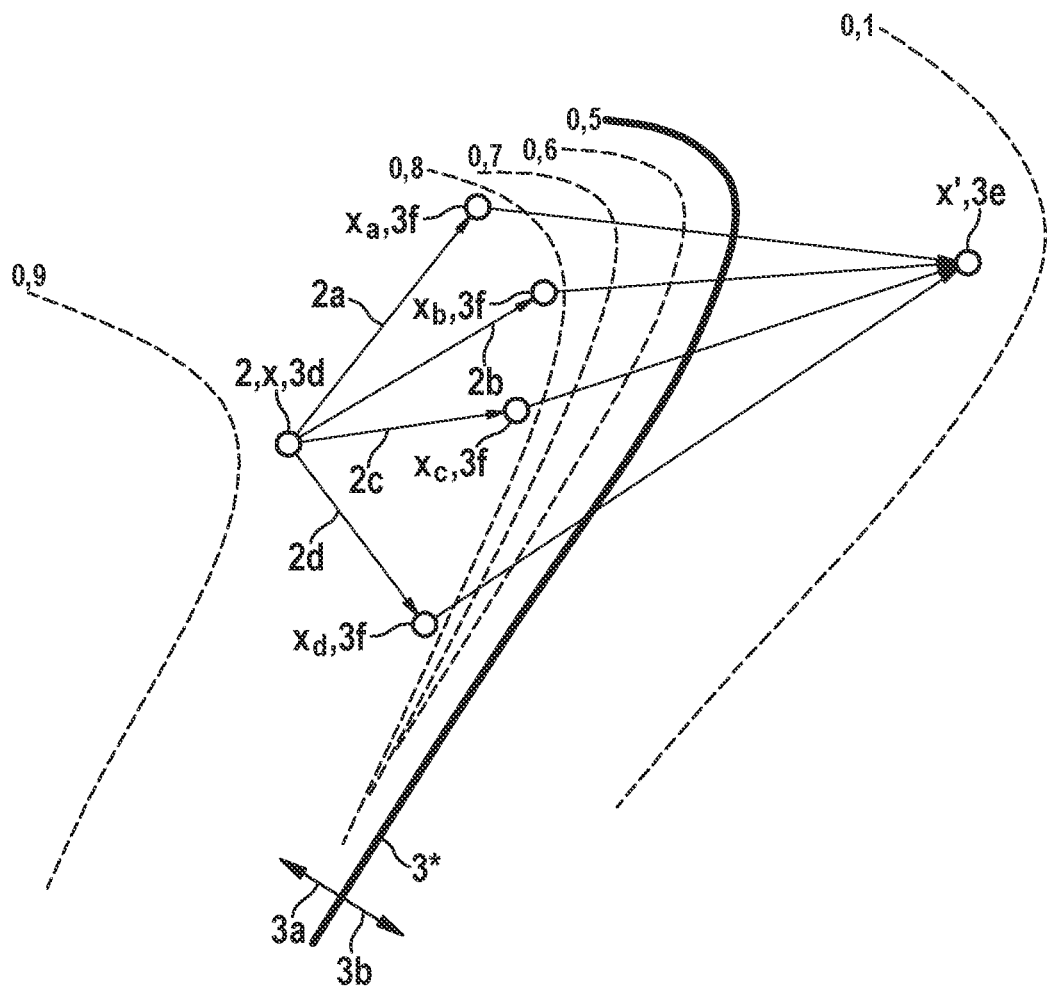
FIG. 2 shows an illustration of the effect of method 100, based on the example of a binary class assignment, in accordance with the present invention.

FIG. 2 illustrates the effect of method 100, based on a simple example of a binary classification, which is controlled by a one-dimensional score value (0.1 to 0.9 in this case). In the case of score value 0.5, the decision limit runs between classes 3a and 3b.

In the example shown in FIG. 2, input data set x, including image data 2, has an initial class assignment 3d with quite a high score value close to 0.9. Four different faults 2a through 2d are ascertained with the aid of method 100, which generate four modifications $x_a$, $x_b$, $x_c$, $x_d$ from input data set x. These modifications $x_a$, $x_b$, $x_c$, $x_d$ each have one class assignment 3f, which assigns them only a score value in the vicinity of 0.8. However, they are still situated on the same side of the decision limit as input data set x. As a result, new class assignment 3f corresponds to original class assignment 3d according to the stipulation of criterion 3*.

However, if all faults 2a through 2d are combined, this results in a modification x' having a class assignment 3e, which contains a score value only close to 0.1. This modification x' is thus situated on the other side of the decision limit. According to the stipulation of criterion 3*, class assignment 3e is thus different than original class assignment 3d.

FIG. 3 shows an example of an application of the method in the visual quality control of products 11. Input data set x is an image 10 of product 11, which has three cracks 12a through 12c. If this image 10 is supplied to classifier 1, it is correctly placed in class 3a="not OK, NOK."

If an individual fault 2a is applied to image 10, a modification $x_a$ results. In this modification $x_a$, only crack 12a is rendered unrecognizable by blurring. The two other cracks 12b and 12c continue to be recognized by classifier 1, and modification $x_a$, in turn, is placed in class 3a "NOK."

However, if multiple faults 2a through 2c are jointly applied to image 10, a modification x' results, in which all three cracks 12a through 12c are rendered unrecognizable. This modification is placed in class 3b="OK" by classifier 1.

Locating faults 2a through 2c, the finding is thus obtained that overall individual faults of this type may not yet result in a misclassification, while an accumulation of such faults may effectuate a misclassification of this type.

What is claimed is:

1. A method for measuring sensitivity of a classifier, the classifier being configured to assign image data to one or multiple classes of a predefined classification, to changes of the image data, the method comprising the following steps:
    detecting image data of products during series manufacturing of the products using at least one optical sensor;
    providing at least one input data set including the detected image data;
    ascertaining, using the classifier, an initial class assignment for the at least one input data set, the classifier including an artificial neural network;
    ascertaining, from the input data set, a plurality of different faults based on objectives, in that:
        a modification of the input data set formed by a joint application of all of the plurality of different faults is mapped by the classifier to a class assignment, which differs from the initial class assignment according to a stipulation of a predefined criterion; and
        each respective fault of the plurality of different faults is such that a modification of the input data set formed by applying only the respective fault and omitting application of all remaining ones of the plurality of different faults, is mapped by the classifier to a class assignment, which corresponds to the initial class assignment according to the stipulation of the predefined criterion;
    filtering out, from the plurality of different faults, a non-essential fault, so that a number of the plurality of different faults is reduced, wherein joint application of the plurality of different faults to the input data set, omitting the non-essential fault from the plurality of different faults, continue to effectuate a change of the class assignment from the initial class assignment;
    wherein each of the plurality of different faults, including the non-essential fault, is a possible defect of a product of the products or a possible instance of damage of a product of the products.

2. The method as recited in claim 1, wherein the faults are ascertained based on a further objective, in that an uncertainty of the class assignment is maximized by the classifier for modifications of the input data set formed by applying one of the faults.

3. The method as recited in claim 2, wherein the uncertainty of the class assignment by the classifier is ascertained based on a distribution of class assignments, which results when, according to a stipulation of a random distribution, neurons or other processing units of the classifier are deactivated.

4. The method as recited in claim 1, wherein the faults are clustered in an unsupervised manner, and an extent to which the number of faults is applicable to a concrete application is evaluated, based on a number of clusters.

5. The method as recited in claim 1, wherein the input data set is mapped to the faults using a generator whose behavior is characterized by generator parameters, and the generator parameters are optimized to a goal that a cost function, to which each of the objectives makes a contribution, assumes an optimal value.

6. The method as recited in claim 5, wherein the generator includes an auto-encoder, which is at least partially congruent with a feature extractor of the classifier.

7. The method as recited in claim 5, wherein the generator parameters are additionally optimized to a goal that the faults ascertained using the generator are mapped by classifier to a predefined desired class assignment.

8. The method as recited in claim 1, wherein the faults each include a reduction of information content of one part of the image data.

9. The method as recited in claim 1, wherein the image data include images recorded at series-manufactured products.

10. The method as recited in claim 9, further comprising:
    checking an extent to which the ascertained faults correspond to features in the images, which are relevant for quality of the product.

11. The method as recited in claim 9, further comprising:
    checking an extent to which the ascertained faults render unrecognizable features in the images, which are relevant for the quality of the product.

12. A non-transitory machine-readable data carrier on which is stored a computer program for measuring sensitivity of a classifier, the classifier being configured to assign image data to one or multiple classes of a predefined classification, to changes of the image data, the computer program, when executed by a computer, causing the computer to perform the following steps:
    detecting image data of products during series manufacturing of the products using at least one optical sensor;
    providing at least one input data set including the detected image data;
    ascertaining, using the classifier, an initial class assignment for the at least one input data set, the classifier including an artificial neural network;

ascertaining, from the input data set, a plurality of different faults based on objectives, in that:
  a modification of the input data set formed by a joint application of all of the plurality of different faults is mapped by the classifier to a class assignment, which differs from the initial class assignment according to a stipulation of a predefined criterion; and
  each respective fault of the plurality of different faults is such that a modification of the input data set formed by applying only the respective fault and omitting application of all remaining ones of the plurality of different faults, is mapped by the classifier to a class assignment, which corresponds to the initial class assignment according to the stipulation of the predefined criterion;
filtering out, from the plurality of different faults, a non-essential fault, so that a number of the plurality of different faults is reduced, filtering out, from the plurality of different faults, a non-essential fault, so that a number of the plurality of different faults is reduced, wherein joint application of all remaining ones of the plurality of different faults to the input data set, omitting the non-essential fault from the plurality of different faults, continue to effectuate a change of the class assignment from the initial class assignment;
wherein each of the plurality of different faults, including the non-essential fault, is a possible defect of a product of the products or a possible instance of damage of a product of the products.

13. A computer configured to measure sensitivity of a classifier, the classifier being configured to assign image data to one or multiple classes of a predefined classification, to changes of the image data, the computer configured to:
  detect image data of products during series manufacturing of the products using at least one optical sensor;
  provide at least one input data set including the detected image data;
  ascertain, using the classifier, an initial class assignment for the at least one input data set, the classifier including an artificial neural network;
  ascertain, from the input data set, a predefined number of different faults based on objectives, in that:
    a modification of the input data set formed by a joint application of all of the plurality of different faults is mapped by the classifier to a class assignment, which differs from the initial class assignment according to a stipulation of a predefined criterion; and
    each respective fault of the plurality of different faults is such that a modification of the input data set formed by applying only the respective fault and omitting application of all remaining ones of the plurality of different faults, is mapped by the classifier to a class assignment, which corresponds to the initial class assignment according to the stipulation of the predefined criterion;
  filter out, from the plurality of different faults, a non-essential fault, so that a number of the plurality of different faults is reduced, the non-essential fault being a fault of the plurality of different faults upon whose omission, filtering out, from the plurality of different faults, a non-essential fault, so that a number of the plurality of different faults is reduced, wherein joint application of the plurality of different faults to the input data set, omitting the non-essential fault from the plurality of different faults, continue to effectuate a change of the class assignment from the initial class assignment;
  wherein each of the plurality of different faults, including the non-essential fault, is a possible defect of a product of the products or a possible instance of damage of a product of the products.

* * * * *